Oct. 17, 1967 R. L. RILEY 3,348,219

MAGNETIC HEAD TRANSIENT MINIMIZATION CIRCUITRY

Filed Dec. 13, 1963

INVENTOR.
RAY L. RILEY,
BY
AGENT.

3,348,219
Patented Oct. 17, 1967

3,348,219

MAGNETIC HEAD TRANSIENT MINIMIZATION CIRCUITRY

Ray L. Riley, Los Angeles, Calif., assignor to Hughes Aircraft Company, Culver City, Calif., a corporation of Delaware Filed Dec. 13, 1963, Ser. No. 330,287
3 Claims. (Cl. 340—174.1)

ABSTRACT OF THE DISCLOSURE

A magnetic head circuit having provisions for minimizing transient currents below a level which can disturb the locations of the poles of magnetically recorded information on magnetic drums, magnetic tapes and other magnetic mediums.

Figure 2:
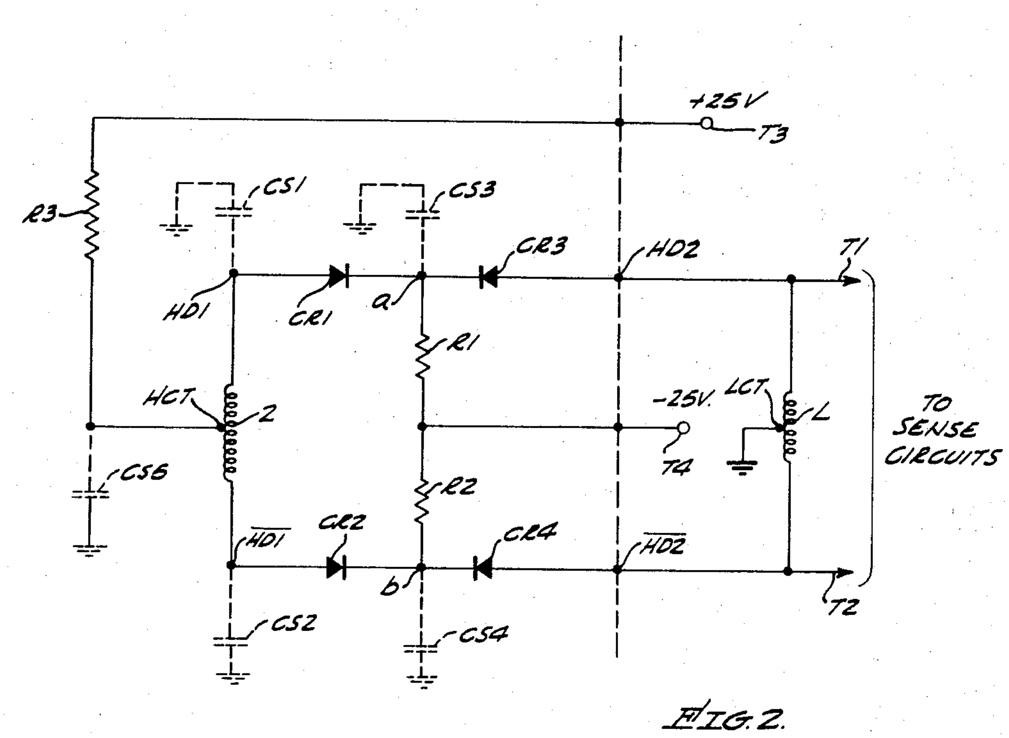

This invention relates generally to magnetic transducer circuits and more particularly to magnetic transducer circuits which are useable in computer memory systems.

Although in the description which follows the invention is described in connection with computer memory systems including magnetic drum storage members, it will be apparent that the principles of this invention may be practiced in memory systems employing magnetic tapes or other moving magnetic members. Similarly, this descriptive disclosure refers primarily to timing tracks in such magnetic memories but it will be appreciated that the invention is not limited thereto but may be practiced also in connection with the information signal tracks in such memories.

Magnetic memories are provided with sensing magnetic heads or read heads which may be of the same type as the magnetic heads which are used to record information on the magnetic drums. In some cases the sense or read heads also record information. These magnetic heads are spaced from the surface of the magnetic material of the magnetic memory by a very small air gap and are magnetically coupled thereto to sense the magnetic state of the discrete magnetic zones or cells. The timing track establishes the basic timing relationships crucial to the data entry and retrieval processes of the memory. This information is recorded in terms of a series of magnetic poles of alternating polarity, each pair of alternate poles defining a magnetic zone or cell. These zones or cells are distributed along the circumference of the track, or along the length of the track in the case of a magnetic tape, according to some timing formula which defines the relative positions of the magnetic poles in terms of circumferential arc. A high degree of precision is demanded of the pole locations and the procedure for recording a timing track is accordingly intricate and specialized.

Patents 2,926,341, 2,903,677 and 2,801,407 show differing arrangements for recording timing tracks. In the recording operation magnetic poles are formed on the timing track by the magnetic fields produced by the recording head in response to recording currents which are forced to flow in the recording head. The resulting pole locations are sensed by a similar magnetic head. In normal use the currents which are allowed to flow in the "sense" head or read head are held below a level which can produce magnetic fields which disturb the locations of the poles on the track. Transients may result, however, from component failures, power supply transients, inappropriate maintenance procedures, and other sources. These transients may be sufficient to disturb the locations of the poles on the track. Once the pole locations on a timing track have been disturbed the drum or other memory member must be removed from service so that the timing track may be restored.

One object of this invention is to provide an improved magnetic transducer circuit useable in computer magnetic memory systems.

Another object of this invention is to provide an improved magnetic transducer circuit of the character referred to which is relatively electrically stable.

A specific object of this invention is to provide an improved magnetic transducer circuit of the character referred to which minimizes electrical transients in the winding of the magnetic head.

The aforesaid and other objects and advantages are accomplished in a magnetic transducer circuit embodying the principles of this invention which comprises a magnetic head and impedance circuits which are rectifier coupled to one another and to the coil or winding of the magnetic head. The transducer circuit is energized by electrical sources having voltages coupled approximately to the electrical centers of the winding of the magnetic head and the impedance circuits. These voltages are preferably, but not necessarily, of approximately the same level or magnitude as those employed in the utilization of sense circuits to which the transducer circuit is coupled and provide steady state or quiescent currents in the circuits including the magnetic head depending upon the DC resistance of the respective circuits. The division of currents in the circuits, including the winding of the magnetic head, changes in dependence upon induced voltages and currents in the magnetic head winding resulting from sensing of magnetic poles on the associated timing tracks to produce electrical outputs coupled to the utilization or sense circuits, individually indicative of the sensed magnetic pole.

Assuming that the voltage sources for creating the transients are bounded by voltages approximating the voltages of the electrical sources aforesaid, the most extreme transient permitted by this transducer circuit results from coupling of such energizing voltages to the output terminals of the circuit, for instance, as a consequence of failure of some component in the utilization circuit. By reason of the electrical isolation afforded by the rectifiers or diodes when back-biased, the currents are redistributed. The rate of current redistribution is limited by the impedances of the affected portions of the impedance circuits and the winding of the magnetic head. The current limiting characteristics are selected consistent with the energy of the sources producing the transients to limit the rate of change of current and the current levels for the circuit configuration selected to values below those which may disturb the poles of the magnetic zones or cells.

Figure 1:
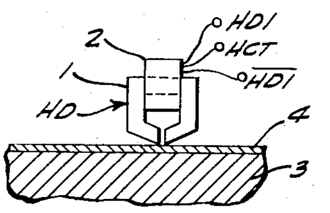

Other objects and advantages will become apparent from a study of the following specifications when considered in conjunction with the accompanying drawings in which:

FIG. 1 schematically illustrates a portion of a magnetic memory; and

FIG. 2 diagrammatically illustrates a transducer circuit embodying the principles of this invention.

There are a number of varieties of magnetic heads which may be used in recording and sensing magnetic zones or cells on a magnetic medium. A typical magnetic head is illustrated in FIG. 1 and is generally designated HD. Such a magnetic head may comprise a generally C-shaped magnetic core formed of a suitable magnetic ferrite material and provided with a pair of confronting pole faces separated by a small gap. This may be an air gap or it may be filled with some suitable electrical conducting or insulating material to properly space the pole faces as indicated. A winding 2 is disposed about a leg of the magnetic core. Such a winding may include a pair of terminals HD1 and $\overline{HD1}$ and a center tap terminal HCT. In conventional usage the application of a voltage across the two outer terminals HD1 and $\overline{HD1}$ produces magnetic flux in the core which links the magnetic medium across the small air gap between each pole tip and the magnetic medium. The magnetic medium may conventionally include a base material such as aluminum in the case of some magnetic drums or discs and a surface magnetic film which may be cobalt nickel or cobalt phosphor, which is capable of retaining a magnetic state produced by the magnetic flux of the head.

According to conventional practice such a magnetic head is usually coupled directly to the utilization or sensing circuits and as a consequence of such direct coupling may be subjected directly to electrical transients resulting from component failures and the like in such utilization circuits.

To minimize the appearance of electrical transients in the winding 2 the present invention, according to a presently preferred embodiment thereof, provides an arrangement including impedance circuits and polarized coupling circuits coupled to the magnetic head and symmetrically energized in a way to minimize electrical transients with respect to the steady state or quiescent currents in the winding of the magnetic head.

As illustrated the winding 2 is provided with a center tap HCT which taps the electrical center of the winding 2. The terminals HD1 and $\overline{HD1}$ of the winding 2 are coupled to the anodes of respective rectifiers or diodes CR1 and CR2, the cathodes of which are coupled to spaced points, in this case the respective ends of an impedance circuit comprising the series connected resistors R1 and R2. A resistor R3 couples a positive voltage supply to the center tap HCT of the winding 2. For the purposes of this description such a positive voltage supply may be of the order of about 25 volts, as shown. Resistors R1, R2 and R3 may be of equal value and may be of the order of about 25,000 ohms each. The circuit further includes an inductor, generally designated L, having a center tap LCT coupling the electrical center of the inductor to ground, as shown. Spaced points, in this case the ends terminals of the inductor L are coupled to the respective ends of the impedance circuit including the resistors R1 and R2 by means of the rectifiers or diodes CR3 and CR4 having their cathodes coupled to the ends of the impedance circuit. The common terminal of the resistors R1 and R2, representing the electrical center of this impedance circuit, is coupled directly to −25 volts, for example, at terminal T4. The diodes CR1 through CR4 may be typical silicon computer switching diodes with similar forward conductance characteristics.

Under quiescent conditions, for the circuit parameters chosen, a current of approximately 1 milliampere is caused to flow in each of the resistors R1, R2 and R3 in response to the applied voltages which are indicated. The current flow through the resistor R3 flows into the center tap of the winding 2 of the magnetic head. Here the current divides such that approximately ½ milliampere of current flows toward each of the spaced points of the winding 2 through respective diodes CR1 and CR2 into resistors R1 and R2, respectively, to the −25 volt terminal T4. Approximately 1 milliampere of current is drawn into the center tap of inductor L where it divides such that approximately ½ milliampere of current flows toward each of the spaced points of inductor L, through respective diodes CR3 and CR4, into resistors R1 and R2, respectively, to the −25 volt terminal T4. Thus, diodes CR1, CR2, CR3 and CR4 will each be biased with a forward current of approximately ½ milliampere. The similar forward conductance characteristics of these diodes provide appropriate current division as described. The currents flowing in the diodes bias the diodes to a point of low incremental impedance, thus coupling the winding 2 to the external circuits for small signals, such as the sense head produces. Upon the occurrence of relative movement between the magnetic medium and the sense or read head, voltages are induced in the winding 2 as the poles pass the magnetic head. The flux changes link the entire winding 2. Thus, the current flow in one portion of the winding will oppose the quiescent current and in the other portion of the winding will aid the quiescent current. Due to the low incremental impedance of the diodes the induced voltage appearing across the winding at terminals HD1 and $\overline{HD1}$ appears at the nodes *a* and *b* and is coupled to the output terminals T1 and T2 through the coupling circuit including the inductor L and the diodes CR3 and CR4.

With a circuit of the type illustrated the magnetic head including coil 2 may also be used to record a timing track, for example, on the magnetic medium. This may be accomplished by coupling the timing track signal generating circuits to the terminals HD1, $\overline{HD1}$ and HCT directly.

Transient currents are minimized in the circuit arrangement herein illustrated by the impedances of the circuit produced primarily by the inductive reactance and resistive properties of the circuit. Assuming that the voltage sources available for producing a transient are bounded by ±25 volts, one of the extreme transient current conditions results from the coupling of +25 volts to the circuit including the terminal HD2 and −25 volts to the circuit including the terminal $\overline{HD2}$, or vice versa. Assuming the first named voltage coupling condition, the node *a* is raised to approximately +25 volts by current flow through the diode CR3. Under these circumstances the diode CR1 is reverse-biased. Simultaneously, the diode CR4 is reverse-biased. The current from resistor R3 normally flowing through the upper tapped portion of winding 2, diode CR1 and resistor R1 is now redistributed through the lower tapped portion of the winding 2, the diode CR2 and the resistor R2. The current in the lower tapped portion of the winding 2 may reach a steady state magnitude of approximately 1 milliampere under the stated coupling of voltages to the terminals HD2 and $\overline{HD2}$. This current may attain a maximum transient magnitude of approximately 2 milliamperes in the presence of initial electrical charges on stray capacitance affects which couple to the circuit. The coupling of stray capacitance affects to the circuit is approximately depicted by capacitors CS1 through CS5 illustrated in dotted outline and coupled to the circuit at the respective points indicated. Although current flow in the lower portion of the winding 2 may reach a magnitude of approximately 2 milliamperes, the magnitude of such current which would be necessary to produce sufficient magnetic flux in the head to disturb the magnetic poles of the timing track is typically considerably larger than 2 milliamperes. Reverse-biasing currents tend to flow in diodes CR1 and CR4. These reverse-biasing currents comprise two components. The first component includes steady state leakage currents which are small in comparison with 1 milliampere and the second component is comprised of charge currents. The maximum transient current which may flow in the head as the result of the diode charge currents is limited by the energy associated with the charge currents and may be expressed as follows:

$$I \leq \left( \frac{\int_0^{25} 2q\,dv}{L} \right)^{1/2}$$

Where:

$q$=diode charge
$L$=inductance of winding 2.

It will be appreciated that the charge currents may be selectively limited by proper choice of the type of diode that is used in the circuit. This charge current is additionally attenuated by the affect of the stray capacitances. These reverse biasing currents therefore may be easily controlled such that the maximum transient current condition set forth before cannot be exceeded as a result of the reverse biasing currents.

From the foregoing it will be appreciated that the magnetic transducer circuit herein described provides transient suppression characteristics which effectively limits the magnitude of current which may flow in the winding of a magnetic sensing head in response to an electrical transient. Although only one embodiment of this invention has been illustrated and described herein it will be appreciated that the invention is not limited particularly to specific types of magnetic heads, to specific types of memory members, or memory materials, employed in such memory members, nor is it limited particularly to the specific impedance circuits which have been illustrated. Additionally, it will be understood that the diodes may be reversed in the circuits and the supply voltages correspondingly reversed while providing operation essentially of the character described herein to provide suppression of circuit transients. Accordingly, it is intended that the foregoing description shall be considered only as illustrative of the principles of this invention and not construed in a limiting sense.

What is claimed is:

1. A magnetic transducer circuit, comprising:

a magnetic device having a coil and a core;

an electrical impedance circuit;

connections substantially at the electrical centers of said coil and said electrical impedance circuit for receiving electrical energy;

a first pair of diodes having corresponding electrodes connected to respective points on said coil on opposite sides of the electrical center thereof and having the remaining corresponding electrodes connected to respective points on said electrical impedance circuit on opposite sides of the electrical center thereof;

a second pair of diodes having electrodes corresponding to the electrodes of said first pair of diodes coupled to respective points on said electrical impedance circuit on opposite sides of the electrical center thereof; and a second impedance circuit having spaced points connected to the remaining electrode of each of said second pair of diodes and having a connection substantially at the electrical center thereof for receiving an electrical potential.

2. Apparatus as set forth in claim 1 in which the cathodes of said second pair of rectifiers are coupled to the cathodes respectively of said first pair of rectifiers.

3. Apparatus as set forth in claim 1 in which said second electrical impedance circuit comprises an inductor.

References Cited

UNITED STATES PATENTS

| | | | |
|---|---|---|---|
| 2,840,726 | 6/1958 | Hamilton | 340—174.1 |
| 3,183,517 | 5/1965 | Dorfman et al. | 346—74 |
| 3,248,717 | 4/1966 | Mayhew | 340—174.1 |

BERNARD KONICK, *Primary Examiner.*

A. I. NEUSTADT, *Assistant Examiner.*